Aug. 22, 1939.  J. HEKTNER  2,170,498
WHEEL AND AXLE ASSEMBLY
Filed May 28, 1938
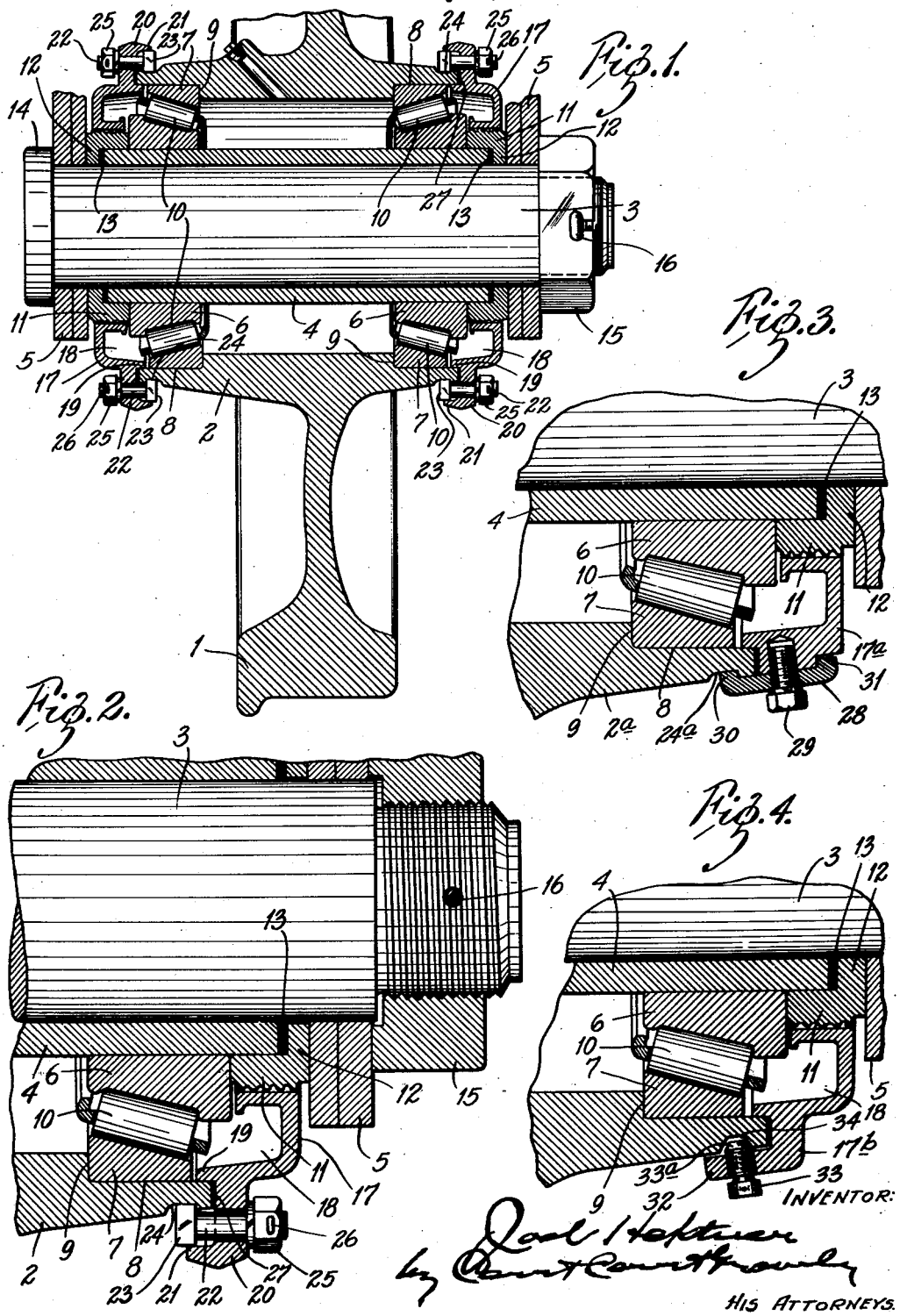
INVENTOR:
Carl Hektner
by Emmet Courthrouly
HIS ATTORNEYS.

Patented Aug. 22, 1939

2,170,498

UNITED STATES PATENT OFFICE 2,170,498

WHEEL AND AXLE ASSEMBLY

Joel Hektner, Canton, Ohio, assignor to The Timken Roller Bearing Company, Canton, Ohio, a corporation of Ohio Application May 28, 1938, Serial No. 210,583

9 Claims. (Cl. 308—208)

This invention relates to wheel and axle assemblies, particularly roller bearing railway car wheel and axle assemblies wherein the wheel hub serves as a reservoir for the bearing lubricant and closure members are removably secured to the ends of the hub for retaining the lubricant therein and for excluding foreign matter therefrom. The invention has for its principal objects to provide additional space for lubricant at the outer ends of the bearings and to provide an improved fastening means for the end closures of wheel hubs that are too thin to accommodate the usual bolt holes. The invention consists in the wheel and axle assembly and in the construction, combinations and arrangements of parts hereinafter described and claimed.

In the accompanying drawing, which forms part of this specification and wherein like symbols refer to like parts wherever they occur, Fig. 1 is a central longitudinal section through a roller bearing wheel and axle assembly embodying my invention;

Fig. 2 is an enlarged fragmentary central longitudinal sectional view similar to Fig. 1; and Figs. 3 and 4 are views similar to Fig. 2 illustrating two modified forms of end closure fasteners.

In the accompanying drawing my invention is shown embodied in a roller bearing railway dump car wheel and axle assembly comprising a wheel 1 having a hollow lubricant containing hub portion 2, a stub axle 3 mounted in said hub, a sleeve 4 mounted on said axle, body supports 5 mounted on said axle beyond the hub and sleeve ends, and antifriction bearings interposed between said axle and hub at the ends of the latter. Each of these bearings preferably comprises a cone or inner bearing member 6 mounted on the sleeve 4, a conical cup or outer bearing member 7 seated in a counterbore 8 in the end of the hub with its inner end abutting against a backing shoulder 9 formed by said counterbore and a series of conical rollers 10 interposed between said cone and cup.

Mounted on the sleeve 4 between the large or outer end of each bearing cone 6 and the adjacent body support 5 is a spacer ring 11 having an internal flange 12 at its outer end that extends between said body support and the adjacent end of said sleeve, shims 13 being interposed between said flange and said end of said sleeve to position the cone axially of the latter. The sleeve 4, body supports 5, spacer ring flanges 12 and shims 13 are all clamped together in endwise abutting relation between a head 14 on one end of the axle 3 and a nut 15 threaded on the other end thereof and locked thereto by a cotter pin 16.

Surrounding the spacer rings 11 are annular closures 17 for the lubricant containing wheel ends of the hub 2. Each of these end closures is shaped to form an annular lubricant space or chamber 18 beyond the outer end of the adjacent roller bearing and has an annular flange 19, which fits within the counterbored cup receiving portion 8 of the wheel hub 2 opposite the outer end of the bearing cup 7, and a portion 20 that is disposed opposite the adjacent hub end and terminates in an inwardly extending annular flange 21 that surrounds but is spaced from the end portion of said hub. Each end closure 17 is secured to the hub 2 by bolts 22 that extend through a circular series of holes formed in the portion 20 of said closure outwardly of the hub end. Each of these bolts has its head 23 fitting between the hub and surrounding peripheral flange 21 of the end closure and seating within a recess or annular groove 24 provided therefor in the outer periphery of said hub. The outer end of each bolt is threaded to receive a nut 25 which is locked thereon by means of a cotter pin 26. A compressible gasket 27 is interposed between each hub end and the end closure therefor.

The hereinbefore described construction has several advantages. The heads of the closure securing bolts are firmly anchored between the peripheral flanges 21 of the closures and the annular seats 24 provided therefor in the wheel hub, and the nuts are located where they may be readily tightened to force said closures tightly against the annular oil seals or gaskets 27. The annular flanges 21 of the end closures serve as pilots for centering the closures with respect to the hub ends and relieve the securing bolts from lateral strains; and the annular recesses 18 in said closures provide an adequate supply of lubricant opposite the outer ends of the bearings. The construction is particularly advantageous in the case of wheel hubs that are too thin to accommodate bolt or screw holes in the ends thereof.

In the modification shown in Fig. 3, the closure fastener comprises a clip 28 that is secured flatwise to the outer periphery of the closure 17a by means of a cap screw 29. One end of the clip 28 overlaps the outer end of the wheel hub 2a and has an inwardly extending flange 30 that seats within a recess 24a in the periphery of said hub. The other end of said clip is provided with a flange 31 that overhangs the outer end of the closure.

In the construction shown in Fig. 4, the end closure 17b has an inwardly extending peripheral flange 32 that overlaps the end portion of the wheel hub 2b and has a screw 33 threaded therethrough that has a conical end portion 33a that fits within a conical recess 34 provided therefor in said hub. The axis of the screw 32 is offset outwardly with respect to the axis of the conical recess 34, whereby the eccentric engagement of said screw and recess causes the end closure 17b to be drawn inwardly towards the hub end.

Obviously numerous changes may be made without departing from the invention and I do not wish to be limited to the precise construction shown.

What I claim is:

1. A wheel and axle assembly comprising a wheel having a hub with shallow recesses in its outer peripheral surface, an axle extending into said hub, roller bearings interposed between said axle and hub at the ends of the latter, annular closures for the ends of said hub and providing lubricant chambers beyond said ends, and fasteners removably engaging said closures and extending into said recesses to clamp said closures to said ends of said hubs.

2. A wheel and axle assembly comprising a wheel having a hub having recesses in the outer periphery thereof adjacent to the ends thereof, an axle extending through said hub, roller bearings interposed between said axle and hub at the ends of the latter, annular closures for the ends of said hub and providing lubricant chambers beyond the outer ends of said bearings, and circumferentially spaced bolts extending through said closures with their heads seated in said recesses.

3. A wheel and axle assembly comprising a wheel having a hub with annular grooves in the outer periphery thereof adjacent to the ends thereof, a stub extending through said hub, roller bearings interposed between said axle and hub axle at the ends of the latter, annular closures for the ends of said hub and providing lubricant chambers beyond the outer ends of said bearings, said closures being provided radially outwardly of the hub ends with a series of circumferentially spaced holes and peripheral flanges that overhang but are spaced from said hub and bolts extending through said holes with their heads disposed between said peripheral flanges and hub ends and seated in the annular grooves of the latter.

4. A wheel and axle assembly comprising a wheel having a hub with annular grooves in the outer periphery thereof adjacent to the ends thereof, a stub axle extending through said hub and having a head at one end and a nut at the other end, body supports mounted on said axle beyond the hub ends, a sleeve mounted on said axle between said supports, roller bearings interposed between said sleeve and said hub at the ends of the latter, spacer rings between said supports and said bearings and having portions disposed opposite the ends of said sleeve, adjusting shims interposed between the sleeve ends and said portions of said spacer rings, annular closures having portions surrounding said spacer rings and forming lubricant chambers beyond the ends of said hub, said closures being provided radially outwardly of the hub ends with a series of circumferentially spaced holes and peripheral flanges that overhang but are spaced from said hub, compressible gaskets between said closures and said hub ends, and bolts extending through said holes with their heads between said peripheral flanges and said hub and seated in the annular grooves of the latter.

5. A wheel and axle assembly comprising a wheel having a hub having recesses in the outer periphery thereof adjacent to the ends thereof, an axle extending through said hub, roller bearings interposed between said axle and hub, annular closures for the ends of said hub and circumferentially spaced bolts extending through said closures with their heads seated in said recesses.

6. A wheel and axle assembly comprising a wheel having a hub with annular grooves in the outer periphery thereof adjacent to the ends thereof, a stub extending through said hub, roller bearings interposed between said axle and hub axle, closures for the ends of said hub, said closures being provided radially outwardly of the hub ends with a series of circumferentially spaced holes and peripheral flanges that overhang but are spaced from said hub and bolts extending through said holes with their heads disposed between said peripheral flanges and hub ends and seated in the annular grooves of the latter.

7. A wheel and axle assembly comprising a wheel having a hub with annular grooves in the outer periphery thereof adjacent to the ends thereof, a stub axle extending through said hub and having a head at one end and a nut at the other end, body supports mounted on said axle beyond the hub ends, a sleeve mounted on said axle between said supports, roller bearings interposed between said sleeve and said hub, spacer rings between said supports and said bearings and having portions disposed opposite the ends of said sleeve, adjusting shims interposed between the sleeve ends and said portions of said spacer rings, annular closures surrounding said spacer rings, said closures being provided radially outwardly of the hub ends with a series of circumferentially spaced holes and peripheral flanges that overhang but are spaced from said hub, compressible gaskets between said closures and said hub ends, and bolts extending through said holes with their heads between said peripheral flanges and said hub and seated in the annular grooves of the latter.

8. A wheel and axle assembly comprising a wheel having a hub with recesses in the outer periphery thereof adjacent to the ends thereof, an axle extending into said hub, roller bearings interposed between said hub and said axle, annular closures for the ends of said hub, and means for removably securing said closures to said hub, said means comprising clips detachably secured to the outer peripheral faces of said closures with one end overhanging the outer ends thereof and with the other end seated in the annular grooves in said hub.

9. A wheel and axle assembly comprising a wheel having a hub with circumferentially spaced conical recesses in the outer periphery thereof adjacent to the ends thereof, an axle extending into said hub, roller bearings interposed between said hub and said axle, annular closures for the ends of said hub, said closures having peripheral flanges surrounding the end portions of said hub, and screws threaded through said flanges and having conical ends eccentrically engaging said conical recesses on the sides thereof nearest the hub ends.

JOEL HEKTNER.